(12) United States Patent
Johnson et al.

(10) Patent No.: US 7,353,447 B2
(45) Date of Patent: *Apr. 1, 2008

(54) SYSTEM AND METHOD FOR REPRESENTING COMPRESSED INFORMATION

(75) Inventors: James David Johnson, Morristown, NJ (US); Schuyler Reynier Quackenbush, Westfield, NJ (US)

(73) Assignee: AT&T Corp, New York, NY (US)

( * ) Notice: Subject to any disclaimer, the term of this patent is extended or adjusted under 35 U.S.C. 154(b) by 803 days.

This patent is subject to a terminal disclaimer.

(21) Appl. No.: 10/780,383

(22) Filed: Feb. 17, 2004

(65) Prior Publication Data

US 2004/0160962 A1 Aug. 19, 2004

Related U.S. Application Data

(63) Continuation of application No. 09/660,031, filed on Sep. 12, 2000, now Pat. No. 6,718,507.

(51) Int. Cl.
*H03M 13/00* (2006.01)

(52) U.S. Cl. .................... 714/776; 382/252

(58) Field of Classification Search ................ 714/776; 382/252

See application file for complete search history.

(56) References Cited

U.S. PATENT DOCUMENTS

| | | | | |
|---|---|---|---|---|
| 5,475,716 A | 12/1995 | Huang | .......... | 375/354 |
| 5,668,601 A | 9/1997 | Okada et al. | .......... | 375/240.25 |
| 5,703,887 A * | 12/1997 | Heegard et al. | ............ | 714/775 |
| 5,710,783 A | 1/1998 | Luthi et al. | ................. | 714/755 |
| 5,761,437 A | 6/1998 | Takano et al. | .............. | 709/247 |
| 5,812,735 A | 9/1998 | Wada | .......................... | 386/81 |
| 5,838,678 A | 11/1998 | Davis et al. | | |
| 5,886,736 A | 3/1999 | Chen | .......................... | 348/43 |
| 6,011,496 A * | 1/2000 | Park et al. | .................... | 341/55 |
| 6,032,197 A | 2/2000 | Birdwell et al. | ............ | 709/247 |
| 6,094,636 A * | 7/2000 | Kim | .......................... | 704/500 |
| 6,108,625 A * | 8/2000 | Kim | .......................... | 704/229 |
| 6,111,916 A | 8/2000 | Talluri et al. | | |
| 6,223,162 B1 * | 4/2001 | Chen et al. | ................. | 704/503 |

(Continued)

FOREIGN PATENT DOCUMENTS

EP  1 014 730 A1  6/2000

(Continued)

OTHER PUBLICATIONS

"Patent Abstracts of Japan", of JP Appln. No. 10 312648, vol. 1999, No. 2, Feb. 26, 1999, Sanyo Electric Co., Nov. 1998.

(Continued)

*Primary Examiner*—Mujtaba K. Chaudry

(57) ABSTRACT

The present invention provides a system and method for storing re-synchronization, error correction and/or error detection data within an existing communication protocol, while still maintaining full compliance to a standard, such as the MPEG-2 AAC standard. By doing so, data information can still be passed from an encoder to a decoder via a channel using an existing and well known standard transport protocol. However, the existing well known transport protocol can now include the data necessary for synchronization of the decoder to the received raw data, along with error detection and error correction by the decoder.

29 Claims, 4 Drawing Sheets

U.S. PATENT DOCUMENTS

| | | | |
|---|---|---|---|
| 6,256,785 B1 | 7/2001 | Klappert et al. | |
| 6,300,888 B1* | 10/2001 | Chen et al. | 341/63 |
| 6,327,688 B1 | 12/2001 | Stolitzka et al. | 714/750 |
| 6,331,829 B2 | 12/2001 | Kawai | 341/94 |
| 6,381,713 B1 | 4/2002 | Irvin et al. | 714/701 |
| 6,396,956 B1 | 5/2002 | Ribas-Corbera et al. | 382/239 |
| 6,430,722 B1 | 8/2002 | Eroz et al. | 714/755 |
| 6,477,681 B1 | 11/2002 | Taipale et al. | 714/795 |
| 6,480,475 B1 | 11/2002 | Modlin et al. | 370/294 |
| 6,490,705 B1 | 12/2002 | Boyce | 714/776 |
| 6,665,345 B1* | 12/2003 | Sekiguchi et al. | 375/240.25 |

FOREIGN PATENT DOCUMENTS

| | | |
|---|---|---|
| JP | 10312648 A | 11/1998 |
| WO | WO 09/28907 A | 7/1998 |
| WO | WO 98/28907 | 7/1998 |

OTHER PUBLICATIONS

Wang et al.: "Error Resilient Video Coding Techniques Real-Time Video Communications Over Unreliable Networks", IEEE Signal Processing Magazine, IEEE Inc., New York, US, Jul. 2000, pp. 61-82.

Bosi, M. et al.: "ISO/IEC MPeG-2 Advanced Audio Coding", Journal of the Audio Engineering Society, Audio Engineering Society, New York, U.S., vol. 45, No. 10, Oct. 1997, pp. 789-812 XP00730161 ISSN: 004-7554 *abstract* *p. 803, paragraph 7.

"Information Technology—Generic Coding of Moving Pictures and Associated Audio Information—Part 7: Advanced Coding (AAC)" ISO/IEC 13818-7, Dec. 1, 1997, pp. I-VI, 1 XP002257439 *pp. 10-18* * paragraph '08.1!—paragraph '08.7!*.

Yao Wang et al. "Error Resilient Video Coding Techniques Real-Time Video Communications Over Unreliable Networks", IEEE Signal Processing Magazine, IEEE Inc. New York, US, Jul. 2000, pp. 61-82. XP002951457.

* cited by examiner

SYSTEM AND METHOD FOR REPRESENTING COMPRESSED INFORMATION

PRIORITY CLAIM

The present application claims priority to U.S. patent application Ser. No. 09/660,031, filed on Sep. 12, 2000, now U.S. Pat. No. 6,718,507 the contents of which are incorporated herein by reference.

BACKGROUND OF THE INVENTION

1. Field of Invention

The invention relates to a system and method for representing compressed information within a data stream.

2. Description of Related Art

Currently, numerous standards exist for encoding data for transmission across a channel to a receiver (decoder). For example, the International Standard ISO/IEC 13818-7, Advanced Audio Coding, also known as MPEG-2 AAC, specifies a syntax for representing compressed audio signals which are suitable for transmission over limited bandwidth channels. The same syntax with one minor backwards compatible extension is International Standard ISO/IEC 14496-3, also known as MPEG-4 audio. Because these standards typically address transmission of the compressed data over bit-serial channels (e.g., a radio modem channel) the compressed format is often referred to as a bitstream, although the standard is equally valid for other transmissions or storage formats.

Current standards for representing compressed data in a data stream may not support re-synchronization of the bitstream and a decoder. Additionally, current standards may not provide for any explicit form of error detection, error control, or error recovery. For example with existing protocols, such as MPEG-2 AAC, it is necessary for the decoder to know the beginning of a received stream of raw data in order for the decoder to be able to decode the raw data. While information for synchronization of a decoder to a raw data stream is available in applications, such as receiving a computer file from a hard drive or the like, in many applications the synchronization information is not available. For example, in satellite or digital radio communications, the decoder can begin to receive the signal at any point during the signal transmission. Accordingly, the decoder needs to be able to synchronize with the signal in order to properly decode the signal.

One solution to resolving the synchronization problem, is to provide a separate synchronization channel in parallel to the data channel. An example of this technique could include having a decoder receive a first data stream containing video data, a second data stream containing audio data and a third data stream containing synchronization data. Accordingly, the decoder may then use the synchronization data to decode and synchronize with both the audio and video data. However, such systems can become very complicated since the decoder must receive and process numerous different signals.

Accordingly, there exists a need for providing a method for representing compressed information which provides for re-synchronization along with error detection and error correction.

SUMMARY OF THE INVENTION

In the Advanced Audio Coding (AAC) syntax, for example, the bitstreams which represent a contiguous interval in the signal time domain can be represented as a series of contiguous raw datablocks in the compressed time domain. The raw datablocks can include a series of elements, such as a single channel element (SCE), a channel pair element (CPE), a coupling channel element (CCE), a lfe channel element (LFE), a data stream element (DSE), a program config element (PCE) and a fill element (FIL).

Of particular interest is the DSE, or data stream element, which is composed of a DSE ID, an element instance tag, a data byte align flag, a count, an Esc count, and a series of data stream bytes. For the DSE, the MPEG-2 AAC standard specifies the length and interpretation of the DSE ID, an element instance tag, the databyte align flag, the count and the ESC count. However, the MPEG-2 AAC standard only specifies the length, but not the interpretation of the data stream bytes. Furthermore, the value of count is equal to the number of data stream bytes that are present in the DSE. Accordingly, the MPEG-2 AAC syntax, and associated semantics, permits the DSE block to carry a number of bytes of information (i.e., "count" occurrences of "data stream byte") whose meaning can be unknown to a standards compliant AAC decoder. By doing so the AAC standard is capable of being extended on a user-specified basis.

The present invention is a method for using the DSE block to give a bitstream of compressed data a re-synchronization, error detection, error control and/or error recovery capabilities while still maintaining full compliance to a standard, such as the MPEG-2 AAC standard. Accordingly, the present invention provides a system and method for storing re-synchronization, error correction and/or error detection data within an existing communication protocol, while still complying with the existing protocol's requirements. By doing so, data information can still be passed from an encoder to a decoder via a channel using an existing and well known standard transport protocol. However, the existing well known transport protocol can now include the data necessary for synchronization of the decoder to the received raw data, along with error detection and error correction by the decoder.

BRIEF DESCRIPTION OF THE DRAWINGS

The invention is described in detail with regards to the following Figures, in which like elements are referred to with like numerals, and in which.

DETAILED DESCRIPTION OF PREFERRED EMBODIMENTS

Figure 1:
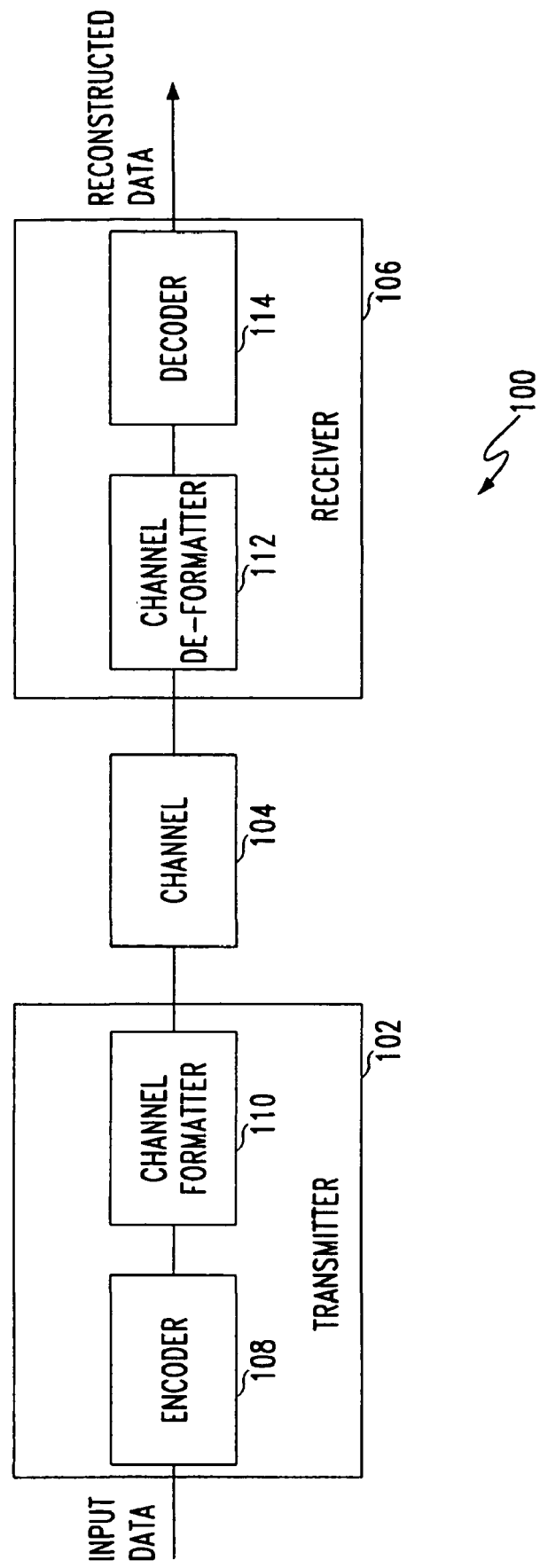
FIG. 1 is an exemplary block diagram showing the transmission of compressed data over a channel according to the present invention.

FIG. 1 is an exemplary block diagram of a data transmission system 100 according to the present invention. As shown in FIG. 1, the system 100 includes a transmitter 102 capable of transmitting compressed data across a channel 104 to a receiver 106. The transmitter 102 includes an encoder 108 and a channel formatter 110. The receiver 106 includes a channel de-formatter 112 and a decoder 114.

In operation, data is input into the transmitter 102 from a data source (not shown). The input data can be any form of data, such as audio data, video data and/or textual data which is to be transmitted to the receiver 106. The input data is received by the encoder 108 which may be any device capable of compressing the input data. In compressing the data, the encoder 108 needs to include a mechanism for the transmission of "user data" in a private data portion of a data stream. Examples of standardized methods for representation of compressed data that have a such a private data portion are ISO/IEC 13818-7, MPEG-2 Advanced Audio Coding (AAC), and ISO/IEC 14496-3, and specifically MPEG-4 General Audio Coding. Both of these standard formats support the transmission of "user data" via the data stream element (DSE) mechanism. The user data mechanism permits the transmitted bitstream to contain private data that need not be interpreted by standard decoders, but may be interpreted by enhanced decoders. The invention applies to the case of enhanced decoders, in which the user data may contain information on how to achieve and maintain encoder and decoder synchronization. The user data may also contain information that can determined whether any transmitted bits were received in error, or information that will help minimize the perceived audio degradation that may result from transmission bit errors. Once complete, the encoder 102 can transmit the compressed input data to the channel formatter 110.

The channel formatter 110 formats the compressed data into a format that is most suitable for transmission over the channel 104. For example, formats can include a radio modulator in the case of a radio transmission channel, or a packet assembler in the case of a packet data channel. The channel formatter 110 then transmits the formatted compressed data across the channel 104 to the receiver 106.

The channel 104 may be any type of medium that allows for the transmission of formatted compressed data from the transmitter 102 to the receiver 106. Furthermore, it is important to note that the channel 104 may be prone to errors in transmission. These errors may manifest as incorrect bits or bytes, or lost or missing bits or bytes. Some examples of possible channels 104 include conventional telephone lines, fiber optic lines, direct serial and parallel connections, cellular telephone connections, satellite communication links, radio frequency (RF) links, local area networks (LANs), intranets and the like.

The formatted compressed data is received by the receiver 106 and input into the channel de-formatter 112. The channel de-formatter 112 can be any device capable of performing the inverse formatting of the channel formatter 110. For example, the channel de-formatter 112 can be a radio de-modulator in the case of a radio transmission channel packet gatherer in the case of a packet data channel. The channel de-formatter 112 then transmits the de-formatted compressed data to the decoder 114.

The decoder 114 can be any device that re-constructs the data received from the compressed data format to an uncompressed format. For example, the decoder 114 may be an ISO/IEC 13818-7 MPEG-2 AAC decoder. The decoder then transmits the reconstructed data to an output of the receiver 106 for further processing.

In a particular embodiment of the invention, the transmitter 102 is always on and transmitting formatted compressed data on the channel 104. At some point in time, the receiver 106 begins receiving the formatted compressed data at an arbitrary point in the stream of formatted compressed data. In order for the decoder to recognize the data, the decoder 114 must be able to recognize the appropriate point in the data stream to begin decoding. The compressed data stream is typically engineered such that these "break-in" points occur many times per second. Identifying the "break-in" points is referred to as synchronization of the encoder 108 and the decoder 114.

As an example of operation, assume that the channel 104 is a terrestrial radio channel, and that the channel formatter 110 is actually a modem, which converts compressed data bits into signal tones for transmission over the channel 104. The channel formatter 110 may also apply some error protection prior to modulation. The channel de-formatter 112 does the inverse, including a possible error correction after de-modulation. If the channel 104 delivers errored bits, then the error correction may correct all errors, or in the case of a very bad channel condition, it may not, so that the errored data is delivered to the decoder 114. If the modem does not enforce byte synchronization, then the decoder 114 must scan all incoming bits and find an appropriate bit at which to begin decoding the audio. If the modem does enforce byte synchronization, then the decoder 114 must only scan all incoming bytes, which is less work.

For an alternative example, assume that the formatter is a radio modem with forward error correction. The receiver begins examining the received bitstream at an arbitrary point in the bitstream, for example, a radio receiver has just tuned to the transmission frequency after the transmission was already in progress. In the most general case, the receiver begins examining a arbitrary bit. If byte synchronization is maintained across the radio channel, the receiver begins examining the most significant bit of an arbitrary byte. The first task is for the decoder to synchronize with the encoder. This is achieved by the decoder identifying the synchword that is in the transport DSE. Once this is done, the meaning of subsequent bits in the bitstream are known and decoding can progress. If additional robustness against synchword emulation is desired, then two or more synchwords can be identified prior to decoding. A block_len field can be used to skip over a current raw_data_block directly to the next synchword without having to actually parse the bitstream information.

Figure 2:
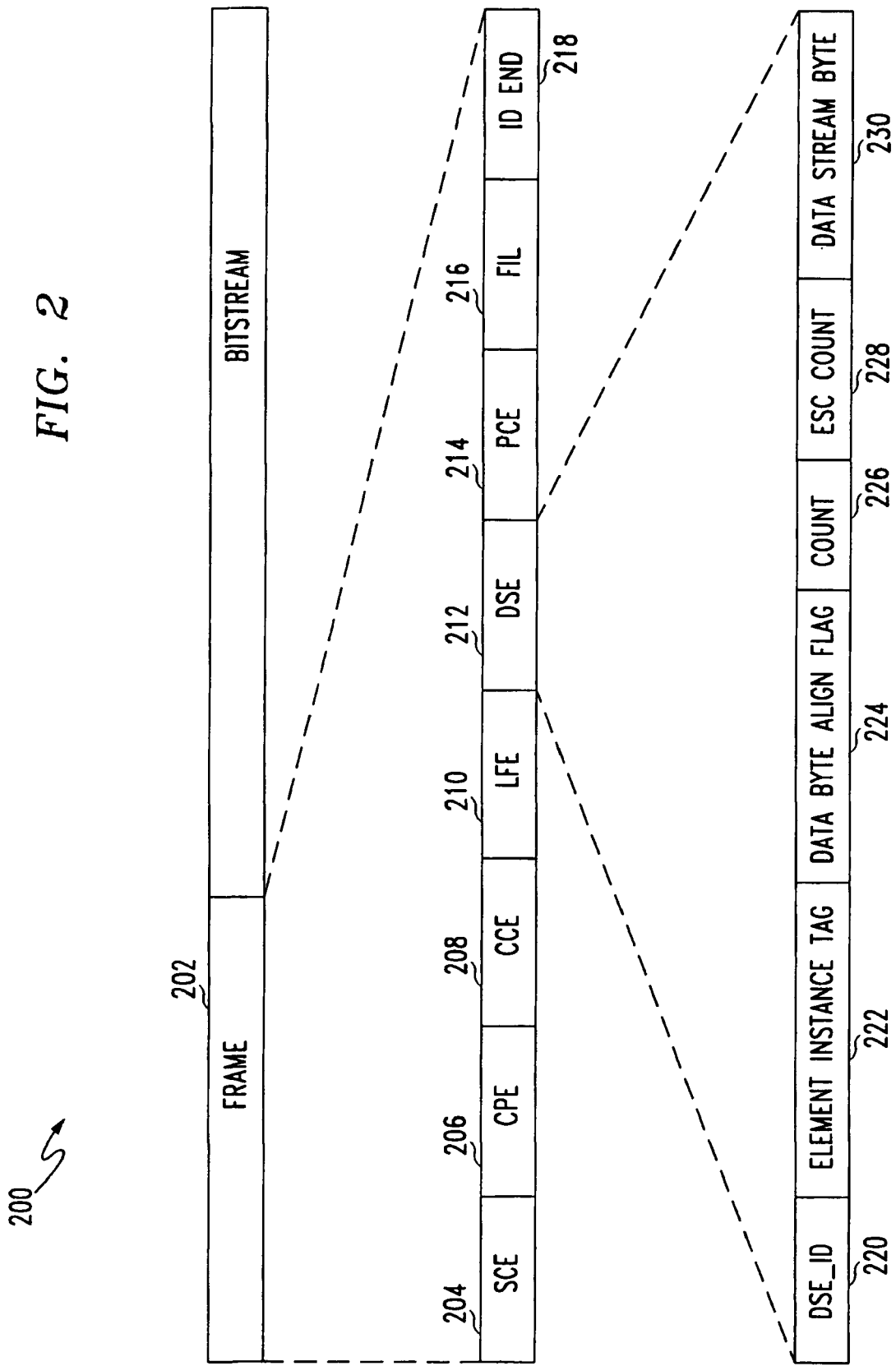
FIG. 2 is an exemplary block diagram of a bitstream of data according to the present invention.

If the radio demodulator does not report bit errors, then a block_crc field can be used to check the integrity of the raw_data_block as a whole. If this fails, then one option is to skip the entire raw_data_block by using the block_len field, and to resume decoding on a next raw_data_block. Since ACC does not have a fixed number of bits per raw_data_block, the block_len field permits the decoder to maintain synchronization to the encoder even in the presence of bit errors. Another option in the case of a block_crc failure is for ele_crc fields to be used to check the integrity of each element in the raw_data_block (those relevant elements are shown in FIG. 2, blocks 204-214). The beginning of each element can be determined by a ele_bit_len field. In this manner, a bit error in one element can be isolated to that element, and all other elements can be successfully decoded.

In a second example, the channel 104 is a packet network, such as the Internet. The channel formatter 110 is a device that formats the compressed data into packets. The channel de-formatter 112 collects the packets, possibly putting them back in the correct order, and delivers the correctly ordered payloads of compressed data to the decoder 114. The channel formatter 110 and channel de-formatter 112 may also implement some sort of error control protocol, such as re-transmission of packets that are not received or are received with errors.

If the encoder 108 delimits each raw datablock for the channel formatter 110, and if the channel formatter 110 forces each packet delivered to the channel 104 to be exactly one raw datablock, and if the channel de-formatter 112 also delimits each raw datablock received, then the decoder 114 re-synchronization is just to start decoding at the beginning of any (delimited) raw datablock. However, if the encoder 108 does not delimit the raw datablock for the formatter 110, then channel packetization is asynchronous with the delimitation of the raw datablocks in the compressed data stream. In this case, the decoder 114 must search every byte in its received packets (packets typically preserve byte synchronization) to find the start of a raw datablock.

In the case that a raw_data_block is fragmented across several transport channel packets, and one of those packets is received in error, the information in the transport DSE can be used to decode much of the information that was received. The general mechanism is very similar to the methods already presented above for the radio modem channel.

FIG. 2 shows an exemplary bitstream 200 of data which the decoder 114 may receive via the channel 106 from the transmitter 102. While the data in the bitstream 200 is in an MPEG-2 AAC format, it is to be understood that any other protocols that provides a private data portion to hold "user data" can be used without departing from the spirit and scope of the present invention.

The bitstream 200 is composed of a series of frames or raw data blocks 202. The frames 202 are further composed of elements 204-218 which are defined by the MPEG-2 standard.

As shown in FIG. 2, the data stream element (DSE) 212 which is composed of a DSE ID 220, an element instance tag 222, a data byte align flag 224, a count 226, an Esc count 228, and a data stream byte 230. In the DSE 212, the MPEG-2 AAC standard specifies the length and interpretation of the DSE ID 220, the element instance tag 222, the databyte align flag 224, the count 226 and the Esc count 228. However, the MPEG-2 AAC standard only specifies the length and not the interpretation of the data stream bytes 230. Furthermore, the value of count is equal to the number of data stream bytes that are present in the bitstream.

Accordingly, the MPEG-2 AAC syntax, and associated semantics, permits the DSE block 212 to carry a number of bytes of information (i.e., "count" occurrences of "data stream byte blocks") whose meaning can be unknown to a standards compliant AAC decoder. By doing so the AAC standard is capable of being extended on a user-specified basis. The DSE block 212 can be used to give a bitstream 200 of compressed data a re-synchronization, error detection, error control and/or error recovery capabilities while still maintaining full compliance to a standard, such as the MPEG-2 AAC standard. Therefore, the technique can store re-synchronization, error correction and/or error detection data within an existing communication protocol, while still complying with the existing protocol's requirements.

The DSE ID field 220 is used to identify the DSE 212 from the other elements 204-210, 214-218 in the frame 202.

The Element Instance Tag field 222 is used to identify the type of data which the DSE 212 is being used to store by predefining a set of data types and a corresponding ID. For example, if the Element Instance Tag were equal to "3", then the data in DSE 212 may be text data, such as the lyrics to a song for which the other elements 204-210, 214-216 are carrying the corresponding audio data portion. Alternatively, if the Element Instance Tag field 222 were equal to "15", then the DSE 212 can be carrying data related to synchronization, error detection or error correction.

The Data Byte Align Flag field 224 can be used to force the data stream bytes to have the same byte framing in the bitstream as the first byte in the raw data stream.

The Count field 226 can be equal to and used to store the number of bytes in the DSE payload.

The Esc Count field 228 is optional, and can be used to extend the range of the Count Field 226.

The Data Stream Byte field 230 is the DSE payload and is the user data in this discussion.

In operation, the transmitter 102 begins transmitting a signal across the channel 104. Subsequently, the receiver 106 begins to receive the transmitted signal at a random point in time. As discussed previously, and also as presented in FIG. 4 below, the decoder 114 would first synchronize with the encoder 108, after which decoding would begin. If there were transmission bit, byte or packet errors, then as previously discussed, the information in the transport DSE could be used to maintain synchronization and to decode most of the information in a raw_data_block that was received correctly.

Figure 3:
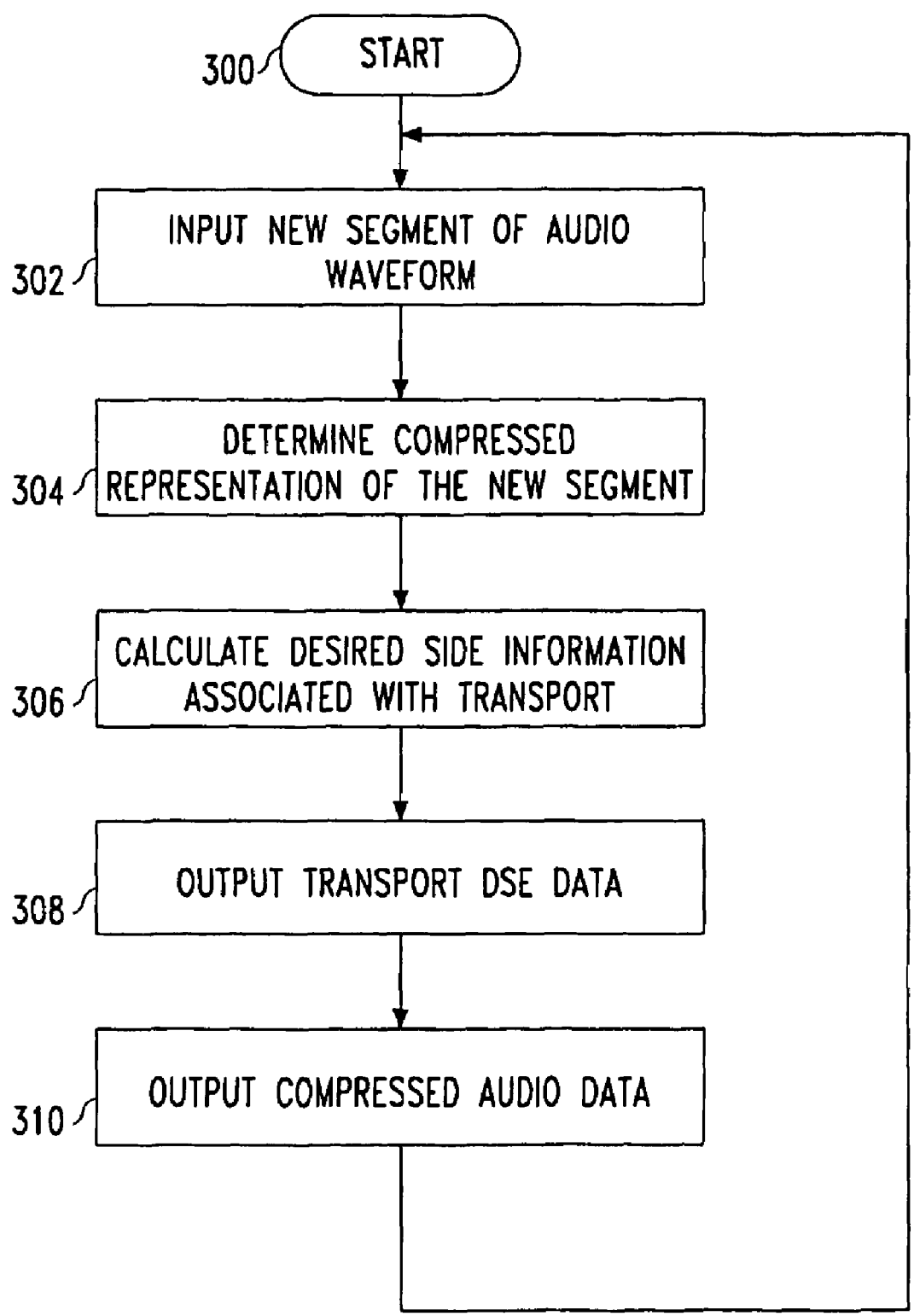
FIG. 3 is a flowchart outlining an exemplary process of encoding data according to the present invention.

FIG. 3 is a flowchart of an exemplary process of encoding input data received by the transmitter 102. For the purposes of this discussion the input data is audio data, however, it is to be understood that the data may be any type. The process begins in step 300 and proceeds to step 302.

In step 302, the input data is received from a data source. As described in block 302, the input data can take the form of a segment of an audio wave form. The process then proceeds to step 304.

In step 304, the input data is compressed by an encoder to form a compressed representation of the data. The process then proceeds to step 306.

In step 306, the side information is calculated. The detail of the side information can vary, and may contain information such as the block_len, block_CRC, and possibly element_bit_len and ele_crc, as discussed above. The process then proceeds to step 308.

In step 308, the side information is packed into the payload bytes of the DSE, for example the user data, and the payload byte count in the DSE is adjusted accordingly. The DSE may typically be output first, prior to any other information in the raw data block. The process then proceeds to step 310.

In step 310, the encoded data is transmitted across a channel. Control then returns to step 302 where the process may be repeated.

Figure 4:
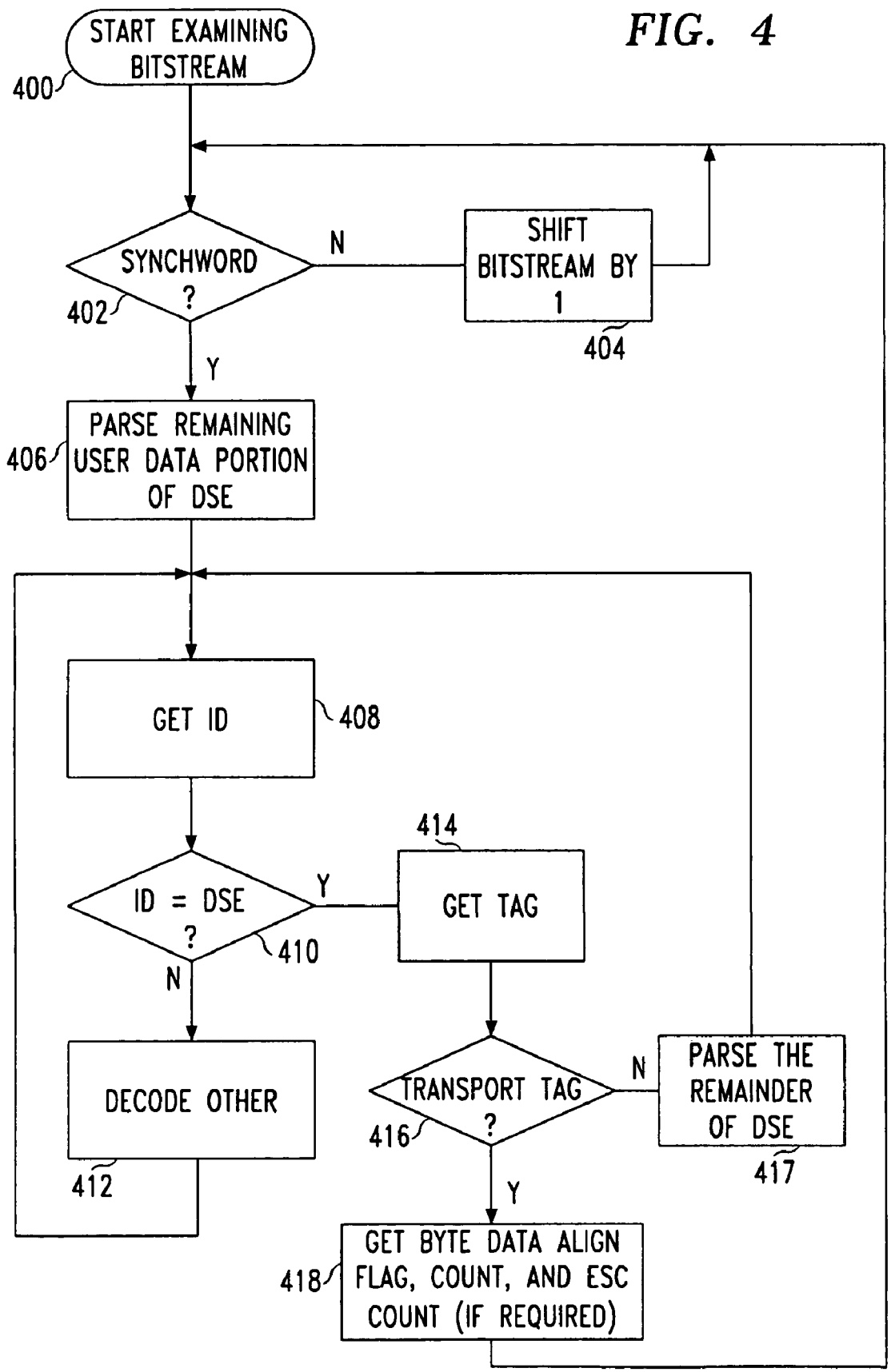
FIG. 4 is a flowchart outlining an exemplary process of decoding compressed data according to the present invention.

FIG. 4 is a flowchart of an exemplary process of decoding a bitstream of the present invention. The process begins in step 400 where a decoder begins to examine a bitstream. The process then proceeds to step 402.

In step 402, the bitstream is further examined by the decoder to determine whether a window of bits is equal to a synchword. If the window of bits is equal to the synchword, then the bitstream is a data stream element (DSE) and the process proceeds to step 406; otherwise the process proceeds to step 404. In step 404 the bitstream is shifted ahead by one bit and the process returns to step 402 where the decoder determines whether the next window of bits is a synchword.

In step 406, the decoder has recognized a synchword in the bitstream and the remaining portion of the user data in the DSE is parsed by the decoder. Information parsed is used immediately, in the case of synchronization, or is saved for possible future use, in the case of error recovery. The process then proceeds to step 408.

In step 408, the decoder gets an ID from the bitstream. Next, in step 410, the decoder checks to see if the ID corresponds to that of the DSE. If the ID is the DSE ID then the process proceeds to step 414; otherwise the process proceeds to step 412. In step 412, the element is not the DSE, and therefore the decoder decodes the other appropriate element, such as SCE 204, CPE 206, CCE 208, LFE 210, PCE 214, FIL 216 and ID END 218. After step 412, the process then returns to step 408 where a next ID is examined.

In step 414, the decoder gets a tag from the DSE. The process then proceeds to step 416, where the tag is examined to see if it corresponds to a transport tag value. If the tag corresponds to the transport tag, then the process proceeds to step 418; otherwise, the process proceeds to step 417.

In step 417, the remainder of the DSE is parsed in the standard manner, and the process returns to step 408.

In step 418, the specified field are parsed. At this point, the next bit to be examined is the first bit in the Data Stream Byte field, and the process returns to step 402.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the present invention.

What is claimed is:

1. A bitstream in computer-readable medium, the bitstream obeying the MPEG-2 or the MPEG-4 protocol that permits the transmission of private data in the data stream element (DSE) field of the obeyed protocol, the bitstream generated according to a method comprising:
   receiving data from a data source;
   determining syntax information for the data;
   encoding the data and the syntax information into an encoded bitstream, at least a portion of the syntax information being included in the DSE field and the interpretation of said portion of the syntax information being unspecified by the obeyed protocol; and
   transmitting the encoded bitstream.

2. The bitstream according to claim 1, wherein said portion of the syntax information permits a decoder to identify a bit at which decoding should begin.

3. The bitstream according to claim 2, wherein the bitstream comprises a plurality of frame portions and wherein each frame portion includes at least one private data portion.

4. The bitstream according to claim 1, wherein the bitstream comprises a plurality of frame portions and wherein said portion of the syntax information permits a decoder to determine if any bits in a frame portion contain errors.

5. The bitstream according to claim 1, wherein said portion of the syntax information permits a decoder to determine if any of the bits in the bitstream contain errors.

6. The bitstream according to claim 1, wherein the bitstream comprises a plurality of frame portions and wherein said portion of the syntax information permits a decoder to determine if any of the bits of at least one sub-portion of a frame portion contain errors.

7. The bitstream according to claim 1, wherein the bitstream comprises a plurality of frame portions and wherein at least some of the frame portions further include one or more sub-portions that vary in number and size between different frame portions.

8. The bitstream according to claim 7, wherein said portion of the syntax information includes at least length information of said one or more sub-portions.

9. The bitstream according to claim 8, wherein a decoder uses the length information to skip sub-portions of a frame portion that are determined to contain errors.

10. The bitstream according to claim 1, wherein the bitstream comprises a plurality of frame portions and wherein each frame portion further includes a plurality of elements, each element including an element ID that identifies a type of element in the bitstream.

11. The bitstream according to claim 10, wherein the plurality of elements includes at least a data stream element having a data stream ID.

12. The bitstream according to claim 11, wherein the data stream element further includes a tag that identifies the type of data contained in a data portion of the data stream element.

13. The bitstream according to claim 12, wherein when the tag corresponds to a transport identifier, the data stream element includes standard information in the data portion of the data stream element.

14. An apparatus that transmits data in a bitstream, the bitstream obeying the MPEG-2 or the MPEG-4 protocol that permits the transmission of private data in a private data portion of the bitstream, the apparatus comprising:
   means for transmitting a bitstream that receives data from a data source, determines syntax information for the data, encodes the data and the syntax information into an encoded bitstream, at least a portion of the syntax information being included in the private data portion of the encoded bitstream, and transmits the encoded bitstream, the interpretation of said portion of the syntax information being unspecified by the obeyed protocol.

15. The apparatus according to claim 14, wherein the portion of the syntax information permits a decoder to identify a bit at which decoding should begin.

16. The apparatus according to claim 15, wherein the bitstream comprises a plurality of frame portions and each frame portion includes at least one private data portion.

17. The apparatus according to claim 14, wherein the bitstream comprises a plurality of frame portions and the portion of syntax information permits a decoder to determine if any bits in the respective frame portion contain errors.

18. The apparatus according to claim 14, wherein said portion of the syntax information permits a decoder to determine if any of the bits in the bitstream contain errors.

19. The apparatus according to claim 14, wherein the bitstream comprises a plurality of frame portions and wherein the portion of the syntax information permits a decoder to determine if any of the bits of at least one sub-portion of the frame portion contains errors.

20. The apparatus according to claim 14, wherein the bitstream comprises a plurality of frame portions and wherein at least some of the frame portions further include one or more sub-portions that vary in number and size between different frame portions.

21. The apparatus according to claim 20, wherein said portion of the syntax information includes at least length information of said one or more sub-portions.

22. The apparatus according to claim 21, wherein the length information enables a decoder to skip sub-portions of a frame portion that are determined to contain errors.

23. The apparatus according to claim 14, wherein the bitstream comprises a plurality of frame portions and wherein each frame portion further includes a plurality of elements, each element including an element ID that identifies a type of element in the bitstream.

24. The apparatus according to claim 23, wherein the plurality of elements include at least a data stream element having a data stream ID.

25. The apparatus according to claim 24, wherein the data stream element further includes a tag that identifies the type of data contained in a data portion of the data stream element.

26. The apparatus according to claim 25, wherein when the tag corresponds to a transport identifier, the data stream element includes standard information in the data portion of the data stream element.

27. A method comprising:
receiving a bitstream having a plurality of frame portions, the bitstream obeying the MPEG-2 or the MPEG-4 protocol that permits the transmission of private data in a private data portion, the interpretation of at least a portion of the data in the private data portion being unspecified by obeyed protocol, the bitstream including encoded data and further including syntax information for the encoded data, at least a portion of the syntax information being included in the private data portion; and
obtaining said portion of the syntax information from said private data portion.

28. The method of claim 27, wherein said obtained portion of the syntax information is synchronization information enabling said bitstream to be synchronized and wherein said method further comprises synchronizing said bitstream utilizing the obtained synchronization information.

29. The method of claim 28, wherein said obtained portion of the syntax information is information enabling a decoder to perform at least one of error detection, error control and error recovery.

* * * * *